United States Patent
Sergent

(10) Patent No.: US 11,278,030 B2
(45) Date of Patent: Mar. 22, 2022

(54) COOKING MODULE FOR A LINEAR TUNNEL OVEN FOR BAKERY PRODUCTS, PASTRIES AND THE LIKE, AND LINEAR TUNNEL OVEN COMPRISING AT LEAST ONE SUCH MODULE

(71) Applicant: MECATHERM, Barembach (FR)

(72) Inventor: Olivier Sergent, Paris (FR)

(73) Assignee: MECATHERM, Barembach (FR)

( * ) Notice: Subject to any disclaimer, the term of this patent is extended or adjusted under 35 U.S.C. 154(b) by 359 days.

(21) Appl. No.: 16/333,309

(22) PCT Filed: Sep. 14, 2017

(86) PCT No.: PCT/FR2017/052459
§ 371 (c)(1),
(2) Date: Mar. 14, 2019

(87) PCT Pub. No.: WO2018/051027
PCT Pub. Date: Mar. 22, 2018

(65) Prior Publication Data
US 2019/0239516 A1    Aug. 8, 2019

(30) Foreign Application Priority Data
Sep. 14, 2016   (FR) ...................... 16 58550

(51) Int. Cl.
*A21B 1/14* (2006.01)
*A21B 1/26* (2006.01)
*A21B 1/48* (2006.01)

(52) U.S. Cl.
CPC ................. *A21B 1/14* (2013.01); *A21B 1/26* (2013.01); *A21B 1/48* (2013.01)

(58) Field of Classification Search
CPC .... A21B 1/14; A21B 1/26; A21B 1/02; A21B 1/245; A21B 1/40; A21B 2/00;
(Continued)

(56) References Cited

U.S. PATENT DOCUMENTS 4,591,333 A * 5/1986 Henke .................... A21B 1/245
432/10

FOREIGN PATENT DOCUMENTS

BE      535353 A    2/1955
DE    2150192 A1    5/1973
(Continued)

*Primary Examiner* — Joel M Attey
*Assistant Examiner* — Yeong Juen Thong
(74) *Attorney, Agent, or Firm* — Craft Chu PLLC; Andrew W. Chu

(57) ABSTRACT

The cooking module for a linear tunnel oven for bakery products includes a cooking chamber having a hearth, in the form of a conveyor belt, that is mobile and permeable to a gaseous heat-transfer fluid, a roof, and a heating device in the hearth and on the roof to cook the products. The heating device in the hearth includes a plurality of orifices for blowing the fluid. The belt is mobile above a sliding surface having openings for the fluid to pass through, and is mobile between two positions, a convection position where the openings coincide with the orifices to let the fluid pass through, and a second position known as a radiation position, where openings are offset from these orifices, the surface forming a screen for the fluid blown through the orifices.

13 Claims, 4 Drawing Sheets

(58) Field of Classification Search
CPC ... A21B 3/04; A23L 13/20; A23L 5/17; A22C 17/12; H05B 3/00; A43D 95/10
USPC ......... 99/360, 377, 386, 324, 373, 423, 427, 99/371, 276, 482, 467, 443, 388, 400, 99/411, 416, 468, 473, 474, 476, 477, 99/447, 446, 483, 339, 331; 126/39 H, 126/39 D, 21 A; 426/641, 443; 219/400; 392/416

See application file for complete search history.

(56) References Cited

FOREIGN PATENT DOCUMENTS

| | | | | |
|---|---|---|---|---|
| DE | 202005004240 U1 | | 5/2005 | |
| FR | 1368595 | * | 9/2006 | ............. F24C 15/32 |
| WO | 02073093 A1 | | 9/2002 | |

* cited by examiner

COOKING MODULE FOR A LINEAR TUNNEL OVEN FOR BAKERY PRODUCTS, PASTRIES AND THE LIKE, AND LINEAR TUNNEL OVEN COMPRISING AT LEAST ONE SUCH MODULE

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The invention relates to a cooking module for a single- or multi-stage linear tunnel oven, used in industrial bakery for cooking bakery products, pastries and the like.

The linear tunnel ovens mainly include a cooking chamber, with its heating means in the hearth and on the roof. Furthermore, this type of oven usually includes a hearth in the form of a conveyor belt, on which the products to be cooked or pre-cooked are caused to rest directly or indirectly, and ensuring their conveying through said cooking chamber.

The cooking of the products during their transit through the cooking chamber of a tunnel oven mainly occurs through the heat from the "hearth" and the heat provided by the roof of the chamber by means of suitable heating means.

2. Description of Related Art Including Information Disclosed Under 37 CFR 1.97 and 37 CFR 1.98

More particularly, in the current state of the art for the various types of existing linear tunnel ovens, these heating means ensure the cooking:
either in the absence of blowing and/or mixing means, only by radiation and conduction with radiators arranged in the hearth and on the roof through which heat-transfer fluids pass;
or exclusively by convection with devices for blowing heat-transfer gases, which blow vertically (in the meaning of the technical definition of convection), from bottom to top through a permeable conveyor belt for heat exchange in the hearth, and a convective blowing from top to bottom for the heat from the roof;
or by radiation and conduction, supplemented with air-circulation devices intended to both standardize the cooking and optimize the possible dough load density per m2, and finally slightly shorten the cooking time.

In the latter type of oven, namely the tunnel ovens ensuring the cooking by radiation and conduction, supplemented with air-circulation devices, we can distinguish:
the radiation ovens equipped with thermal oil fluid radiators, arranged in the hearth and on the roof, often equipped with air-circulation devices located in the edges of the cooking chamber, putting into motion the air contained in said cooking chamber, which is raised and maintained under heat through radiation by the radiators;
the ovens, in particular described in WO 2005/117593, which are equipped in the hearth and on the roof with radiators heated by heat-transfer gases with, as a peculiarity, hearth radiators, which are not directly and as close as possible under the conveyor belt, but way below at a distance of a few centimeters. The area thus released between the radiator and the conveyor belt forms a plenum permitting the blowing of heated air in contact with the radiator between a series of blast nozzles and a series of suction slots arranged in front of each other in a horizontal plane parallel to the cooking belt. It should be noted that in these ovens according to the state of the art, only a small portion of the volume of air being blown passes through the cooking belt, since both the blast nozzles and the suction slots are located under the conveyor belt. In addition, this blowing is not a convection, but an advection, since it occurs in a horizontal plane;
the ovens with hearth convection with heat-transfer gas blowing vertically through the conveyor belt, as known for example from WO 2014/53745. These ovens ensure a cooking by convection and radiation from the hearth. In particular, this oven includes, directly under the permeable conveyor belt, radiator-forming sleeves, through which the heat-transfer fluid passes. More specifically, these sleeves include blast nozzles under the conveyor belt, from which the heat-transfer fluid blown into these sleeves emerges. In short, these known ovens are unable to ensure cooking exclusively by radiation from the hearth, since the hot convection gases ensure, during their transit through their distribution sleeves, the heating of said sleeves and hence their radiation. In the event of stopping the convection, the oven no longer has any heating from the hearth and, therefore, any radiation.

In the current state of the art is also known a fourth type of tunnel ovens ensuring the cooking electrically, through heating by electric resistors arranged in the hearth under the conveyor belt for heating by radiation from the hearth and with electrical resistors arranged on the roof by radiation from the roof.

These ovens are simply ovens operating by radiation with the eventuality of the addition of a device for circulating the air of the cooking chamber and the cooking by convection from the hearth is not possible.

In the four types of tunnel ovens described above, the products can be cooked by being placed directly on the conveyor belt (so-called hearth cooking), or they can be previously arranged on plates or in molds. This type of cooking is usually referred to as cooking on plates or cooking in molds.

In the four types of tunnel ovens described above, the conveyor belts can be more or less permeable with heat-transfer fluid permeability rates varying according to the type of cooking and the type of products that are desired.

In this respect, the conveyor belts can range from "solid" belt, comprised of contiguous stone blades or metal plates attached to each other by hinges in order to form, in the horizontal path, a solid and continuous stone or metal hearth, to the other extreme, where this conveyor belt can include a very open mesh, in particular for the conveying of molds or plates forming heavy assemblies, where only a powerful hearth convection ensures good cooking performances.

In the event of cooking directly in the hearth, the cooking by conduction and radiation provides the best results.

In the event of cooking of products on plates, the heat exchange in the hearth must be reinforced beyond only heat exchanges by conduction and radiation, because the product to be cooked is not into direct contact with the hot hearth of the oven, and in this case, a combination in the hearth between a heat exchange by radiation and a heat supply by convection is necessary for a quick "setting" of the dough in the hearth, despite the presence of the plate.

In the event of cooking of products in molds, the large mass of steel represented by the mold batteries, even higher when they are molds with lids necessary for cooking sandwich loaves, for example, is added to the mass the dough contained in the molds and the cooking requires a very large supply of calories by the hearth, which ideally corresponds to a strong convection from the hearth.

The cooking of this type of products can be performed in ovens without convection, but in this case the cooking times are much longer, about 30 minutes, on the conventional radiating tunnel ovens, in comparison with about 20 minutes on the tunnel ovens with hearth convection.

In the state of the art are also known other types of continuous cooking ovens that do not adopt the form of the linear tunnel and that therefore depart from the scope of the present invention. These cooking ovens are strictly limited to the cooking of products on plates or in molds because of the features of their mechanism, which ensures the conveying of the products between the inlet and the outlet of these ovens.

Known in particular are:
ovens with hanging or pulled trolleys, which are, in turn, loaded with plates or molds, which pass through a large cooking chamber;
ovens with spiral belt passing through a large cooking chamber;
cellular or non-cellular vertical ovens including a noria of plates arranged in ascending and/or descending columns;
ovens including a closed-loop mechanism carrying cooking plates forming hearths integral with the mechanism and remaining in the oven.

These ovens, by design, substantially depart from the scope of the present invention, namely the linear tunnel ovens and the heating problems resulting therefrom, problems to which the present invention provides solutions.

For each of the types of ovens described corresponding to the current state of the art, the method for heating from the hearth is fixed and only adjustable by the operator (apart from the usual setting of the cooking time) are the cooking temperatures, and for the ovens with air convection or circulation, the volumes, hence the speeds, of the air or heat-transfer gases put into motion.

The thermal rigidity of ovens currently on the market requires the manufacturers to multiply the ovens they operate, being obliged to dedicate them to cooking products or families of products for which they are thermally designed, which leads to their underutilization and, in the case of a transfer of the production of a product from one oven to another, which is thermally different, both the cooking quality and the profitability suffer therefrom.

To these ovens of the state of the art should be added the one described in WO 02/073093, which consists of an oven for cooking bakery products, pastries and the like, such as a tunnel oven. The latter includes a roof provided with means for heating alternatively by convection or radiation.

More specifically, through this roof vertically pass pipes or sleeves extending in the cooking chamber.

Through some of these sleeves, the heat-transfer fluid can be blown into the cooking chamber, in particular through a pressure chamber, hereinafter referred to as plenum, communicating with said chamber through the upper wall of the latter, which is provided with air inlets in order to ensure heating by convection.

The second part of the sleeves communicates with air outlets, also positioned at the level of said upper wall of the chamber. Each of these air outlets is connected to a duct passing through the pressure chamber and permits to guide the air leaving the chamber of the oven and to lead it to a manifold placed outside said pressure chamber.

The so recovered air is returned by a turbine to said pressure chamber after passing through heating means.

The sleeves in question are positioned on the roof at the level of a slidably mounted plate inside the chamber of the oven in order to vary the relative position of said sleeves with respect to the air inlets/outlets.

It is well understood that, though such an oven is capable of providing, on the roof, heating alternately by radiation or by convection, even both simultaneously, it has the drawback of a complex design cumbersome in height.

Indeed, in order to ensure heating by convection, and supply with heat-transfer fluid the pipes passing through the plenum on the roof, above this plenum must necessarily extend a chamber for supplying said pipes with heat-transfer fluid.

Moreover, in order to ensure more or less efficient convective heating from the roof, many pipes must thus pass through this plenum, while creating inside the latter a resistance, and therefore a significant loss of load, to the circulation of the heat-transfer fluid in this plenum in case of heating by radiation. This is further emphasized by the fact that half of the tubes are intended to permit an evacuation of the air, finally resulting in a non-uniform heating and cooking of the products from the roof.

It is also planned to be able to bring the heat-transfer fluid under the permeable hearth in order to similarly create a heating from below of the products to be cooked, by providing for example a second pressure chamber, with a second turbine and additional heating means under the chamber.

In short, here too complexity and bulkiness is added to the device, also without achieving an optimal and homogeneous cooking from the hearth, namely because of the alternate presence of air inlets and outlets throughout the length of the device.

BRIEF SUMMARY OF THE INVENTION

The innovation described in the present application provides thermal adaptation flexibility intended to meet the concerns of optimization of the production means in the industrial bakery, without compromising on quality, since the invention permits to choose the type of heat exchange from the hearth that is ideally suited for the type of products to be cooked.

Thus, the invention more particularly relates to an innovative device, which permits the operator to choose his cooking mode from the hearth by selecting among:
  cooking from the hearth exclusively by radiation and conduction, or
  cooking from the hearth exclusively by convection, or
  cooking from the hearth combining radiation, convection and conduction.

Such a device permitting this choice on a single oven, permitting a modular cooking from the hearth while ensuring homogeneity in cooking and an optimal quality of the finished product, has never been made so far.

To this end, the invention relates to a cooking module for a linear tunnel oven for bakery products, pastries and the like, including a cooking chamber comprising a hearth, in the form of a movable conveyor belt permeable to a fluid, a roof, and heating means in the hearth and on the roof for cooking or pre-cooking said products that rest on the conveyor belt either directly or indirectly through a suitable cooking support such as a plate, a net or a cooking mold, said heating means in the hearth comprising a plurality of orifices for blowing the gaseous heat-transfer fluid under said conveyor belt.

Said cooking module is characterized in that said conveyor belt is movable above a sliding surface comprising openings for the passing through of said heat-transfer fluid, this sliding surface being movable between at least two positions, among which a so-called convection position, in which said openings of the sliding surface coincide with the blowing orifices of the heating means in the hearth for letting pass the heat-transfer fluid, and at least one second so-called radiation position, in which said openings are offset from these blowing orifices, the sliding surface forming a screen for the heat-transfer fluid blown through the blowing orifices.

In a particular exemplary embodiment of the module of the invention, the heating means in the hearth include transverse rows of blowing orifices and said sliding surface consists of a metal sheet comprising openings also arranged in transverse rows, spaced apart according to a spacing pitch corresponding to that of the transverse rows of the blowing orifices.

In an alternative embodiment, the heating means in the hearth include rows of blowing orifices, where the orifices of adjacent rows are arranged in a staggered way, while said sliding surface consists of a metal sheet comprising openings having an arrangement identical to that of the blowing orifices.

Such a staggered arrangement permits a more uniform blowing through the conveyor belt in the convection position.

Most preferably, the heating means in the hearth include blowing orifices arranged in, as the case may be, transverse or longitudinal rows, the sliding surface comprising, as the case may be, transverse or longitudinal sliding blades, between said blades extending slots corresponding to the rows of blowing orifices so as to be located in front of the latter in the so-called convection position or offset with respect to these orifices in the so-called radiation position, in which said blades form a screen for the passing through of the heat-transfer fluid.

Advantageously, in this case where the sliding path is comprised of sliding blades, the heating means in the hearth include, as the case may be, transverse or longitudinal rows, blowing orifices spaced apart according to a pitch corresponding to the spacing pitch of said blades.

Thus, in the radiation position, when the blades of the sliding surface are located directly over the blowing orifices, said blades are heated by the heat-transfer fluid and will, in turn, heat the hearth in the form of a conveyor belt by conduction and radiation, permitting the cooking of the products.

In the convection position, where the slits of the sliding surface are located directly above the blowing orifices, the flow of gaseous heat-transfer fluid passes between two blades through the conveyor belt, providing a cooking by convection of the products.

Therefore, within the framework of an inventive step has been imagined to replace, in a linear tunnel oven exclusively with convective heating from the hearth according to the state of the art as reminded above, the fixed sliding path, which usually supports the conveyor belt, by a movable sliding path comprised for example of sliding blades, namely connected to each other and spaced apart by slots:
  which blades can be positioned above the blowing orifices, or nozzles, which results into deflecting the heat-transfer fluid, for example, towards suction orifices provided for laterally and under the level of the conveyor belt, and in this case, the blades are heavily loaded with heat, while blocking the convective flow that can no longer pass through the conveyor belt;
  or which blades are placed in position so as to have the slots between the blades above the convection orifices and, in this case, the oven is a hearth convection oven, the blades being intended only as a sliding support for the conveyor belt.

In the latter case, the heat-transfer fluid flow that passes through the belt can be sucked by suction orifices provided for in the portion of the cooking chamber located above this conveyor belt.

Intermediate positions, in particular blades forming a sliding path, between the two outermost positions, namely the so-called radiation position and the so-called convection position, are possible, which permits to combine a heat from the hearth resulting from a mixture of convection and radiation.

These properties are of course also present in the other embodiments of the invention, as will become evident in the following detailed description.

The advantages resulting from the present invention mainly consist in that it is possible, by means of a single cooking module or a single linear tunnel oven including at least one such cooking module, to provide a method for cooking by conduction and/or radiation only or by convection only, or even to combine both.

By applying the invention to several modules, which the oven is comprised of, it is possible, for the same product, to have independent settings for each module, permitting to accurately adapt, at each cooking step, the mode of transfer of heat from the hearth for an optimal cooking quality.

It is therefore clearly established that a cooking module for a linear tunnel oven according to the invention, with heat exchange in the hearth selectable between radiation, convection or a combination of both, depending on the characteristics of the products to be cooked, and an linear tunnel oven comprised of at least one such module, constitute a real advantage for the manufacturer.

By means of the invention, the manufacturer will have a single oven that can indifferently ensure the cooking of different product families under unquestionable conditions of efficiency, quality, and therefore profitability.

Advantageously, the heating means in the hearth consist of a convection plenum.

Preferably, said sliding surface is movably mounted by means of driving means, such as a mechanism on a pusher, capable of providing the sliding surface with a stroke adapted to the passing of said surface from the convection position to the radiation position, and vice versa.

For example, when said surface comprises sliding blades, this stroke can correspond substantially to half of the distance between two blades.

When the sliding surface is comprised of sliding blades, the latter can be in the form of inverted gutters so as to also act as a guide for the heat-transfer gas that is blown in order to bring it to the sides of the module, to avoid a circulation of the heat-transfer gas flow in the cooking chamber.

Means for suctioning the gaseous heat-transfer fluid from the hearth can also be provided in the present cooking module, these means comprising suction openings located on at least one of the lateral sides of said hearth and under the latter.

Preferably, said suction openings communicate, through suitable sleeves, with a centralized suction circuit, which suction openings located in the cooking chamber, above the conveyor belt, are connected to, said suction means including in addition suction management means, as the case may be, under and/or above the level of said hearth.

The invention also relates to a linear tunnel oven comprising at least one cooking module as described above.

Said linear tunnel oven can advantageously include a plurality of such modules, which are juxtaposed.

Thus, advantageously, one (or more) module, which the assembly is comprised of, may have its own cooking regulation, for example as regards the temperature of the heat-transfer fluid or also the heating mode for the products, essentially by convection, essentially by conduction and/or radiation, or by a combination of the two modes. In the same way, the movable sliding surfaces are preferably independent for each of the cooking modules the entire linear tunnel oven is comprised of.

Thus, it is possible to provide different exposures to the flow of heat-transfer gas during the cooking phase of the products.

Further aims and advantages of the present invention will become evident from the following description relating to an exemplary embodiment given by way of indication and non-restrictively.

The understanding of this description will be facilitated when referring to the attached drawings.

DETAILED DESCRIPTION OF THE INVENTION

As shown in the figures of the attached drawings, the present invention relates to a cooking module 1 for bakery products 2, pastries or the like, for a linear tunnel oven.

Figure 1:
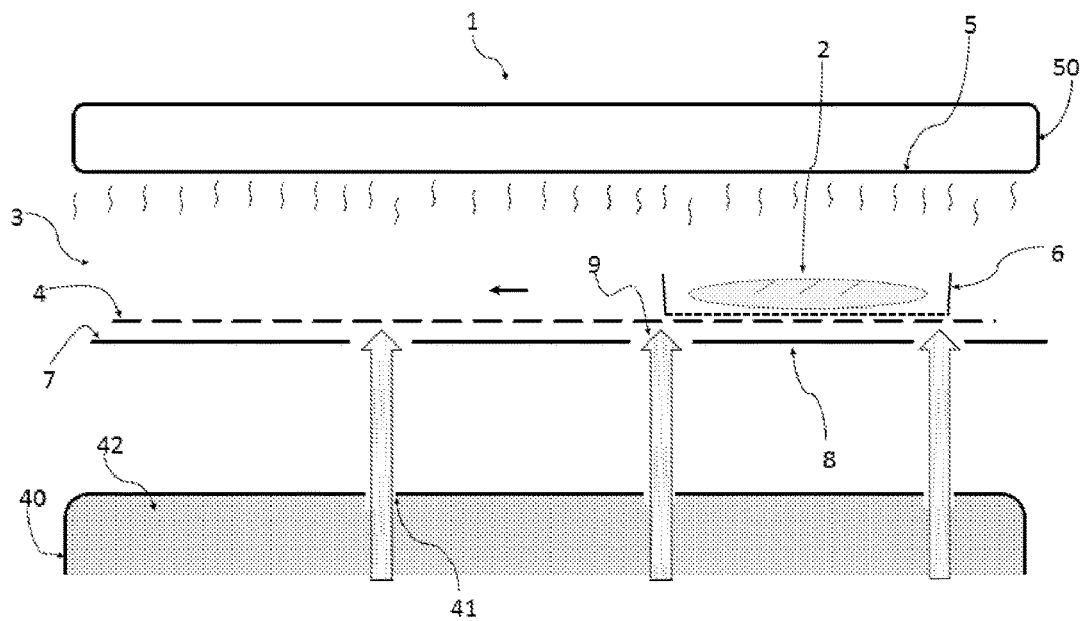
FIG. 1 is a schematic, longitudinal cross-sectional view of a particular embodiment of the cooking module according to the invention, in the so-called convection position, where the openings of the sliding surface coincide with the blowing orifices. There is a sole heating means in the hearth, so as to let the flow of heat-transfer gas pass through the conveyor belt.
Figure 2:
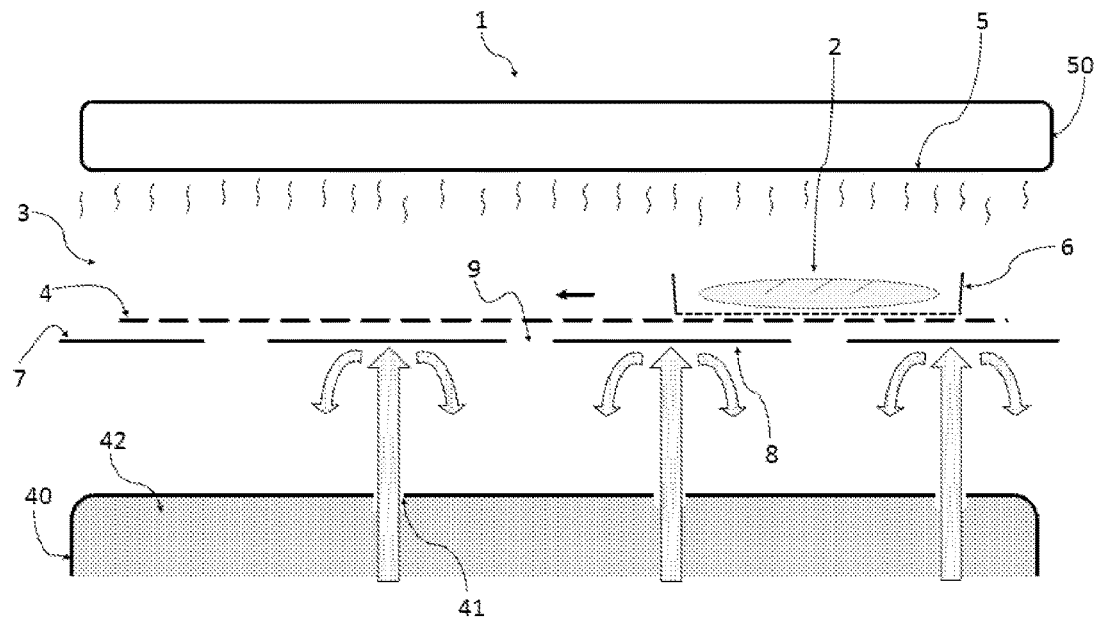
FIG. 2 is a schematic view similar to FIG. 1, with the difference that the sliding surface is in the so-called radiation position, the openings provided for on the sliding surface being offset with respect to the blowing orifices of the heating means in the hearth, the flow of heat-transfer gas abutting against the lower face of the sliding surface.

As schematically shown namely in FIGS. 1 and 2, this cooking module 1 includes at least one cooking chamber 3 comprising a hearth portion 3A and a roof portion 3B.

In particular, in this hearth portion, there can be a conveyor belt 4 designed openwork in order to permit, through the latter, a convection heating of the products 2 to be cooked.

On the conveyor belt 4 rest the products 2 to be cooked or pre-cooked, either directly or indirectly, as shown in FIGS. 1 and 2, for example by means of suitable cooking supports 6, such as cooking plates, nets, molds or the like.

Within the framework of the present invention, the conveyor belt 4 is movable and passes through the cooking chamber 3 from an inlet to an outlet while describing a looped circuit, and the module 1 is a cooking module described as "continuous", the direction of movement of the belt being symbolized by an arrow.

The hearth portion 3A and the roof 5 portion 3B can include heating means for the cooking module (first heater 50, and second heater 40, respectively).

As regards the heating means as the second heater 40 in the hearth portion, they can consist, for example, of a convection heating plenum 42 including a blowing surface 41A and a plurality of gaseous heat-transfer fluid blowing orifices 41, or blowing slots.

Figure 9A:
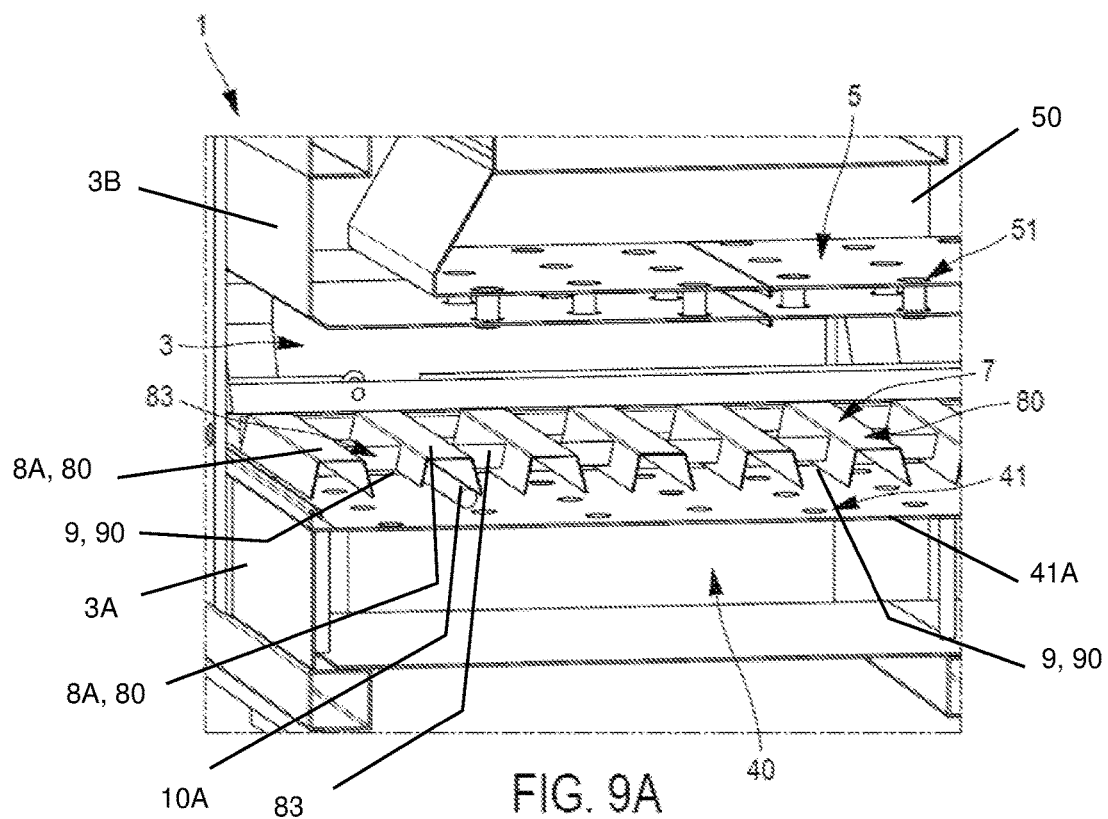
FIGS. 9A and 9B are schematic perspective views of a detail of a cooking module of the invention, namely the sliding path of the conveyor belt, as well as, for FIG. 9B, a mechanism on a pusher outside the cooking chamber and capable of driving the sliding path, and namely the blades thereof, in motion.

More specifically, said gaseous heat-transfer fluid is heated through a suitable heating circuit, not shown in the attached figures, before being discharged under the plenum 42 including blowing orifices or slots 41, which are preferably arranged in transverse rows, as shown for example in FIG. 9A.

At the level of said roof 5 in the roof portion 3B, the aim of said heating means will be a first heater 50 to ensure a cooking of the products 2 by radiation, as shown in FIGS. 1, 2, 5 and 6, or also by convection, through a plurality of blowing orifices 51 in the roof, which are shown in the attached FIG. 9A.

Figure 5:
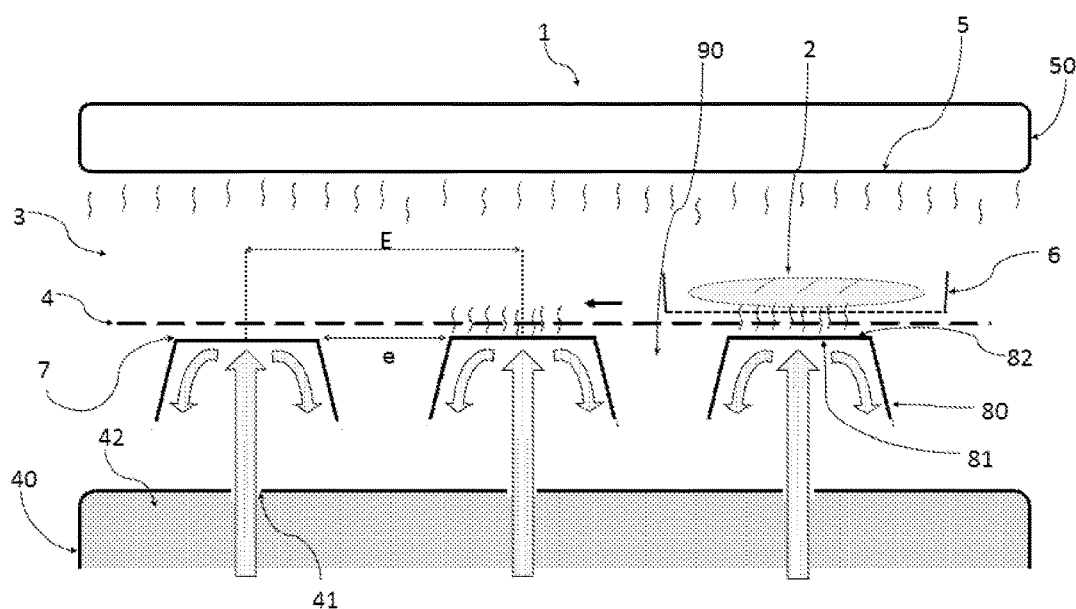
FIG. 5 is a schematic, longitudinal cross-sectional view of a particular embodiment of the cooking module according to the invention when the sliding surface of the conveyor belt includes a plurality of transverse sliding blades, the latter being positioned directly above the blowing orifices of the heating means in the hearth in the so-called radiation position.
Figure 6:
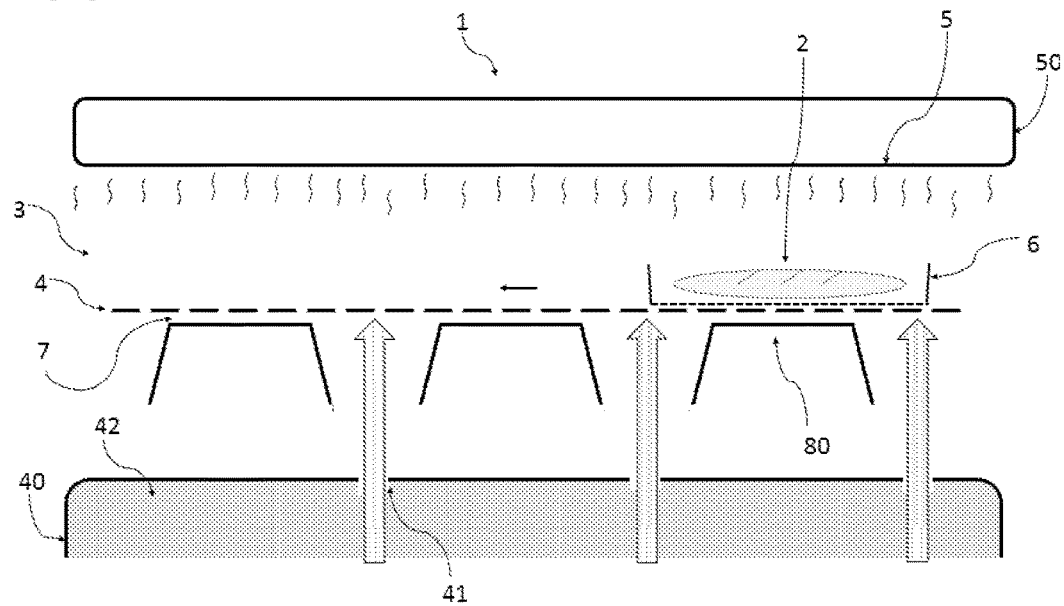
FIG. 6 is a schematic view similar to FIG. 5, except that the blades of the sliding path are offset with respect to the blowing orifices of the heating means, so as to permit the flow of heat-transfer gas to pass through the conveyor belt.
Figure 7:
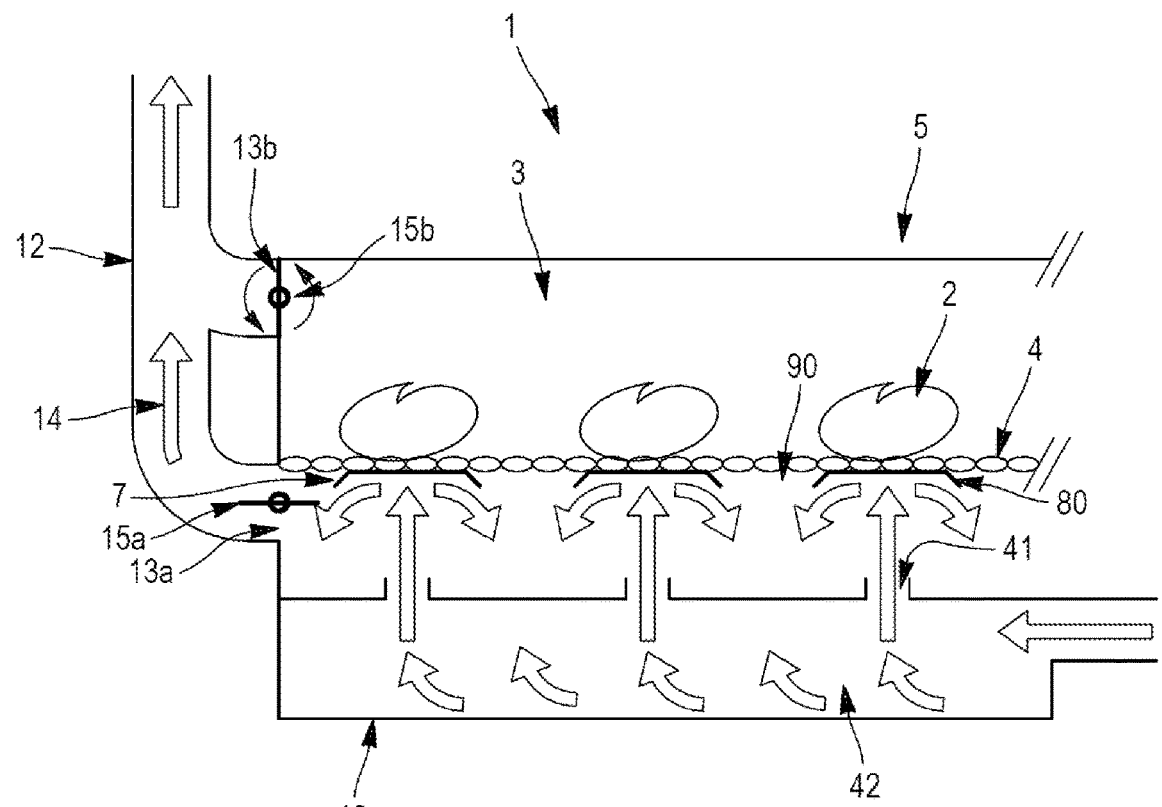
FIG. 7 is a schematic, cross-sectional view of a particular embodiment of the cooking module according to the invention when the sliding surface of the conveyor belt includes a plurality of longitudinal sliding blades, the latter being positioned directly above the blowing orifices of the heating means in the hearth, in the so-called radiation position, the heat-transfer gas flow abutting against the lower face of said blades and being sucked through suction means located under the belt.
Figure 8:
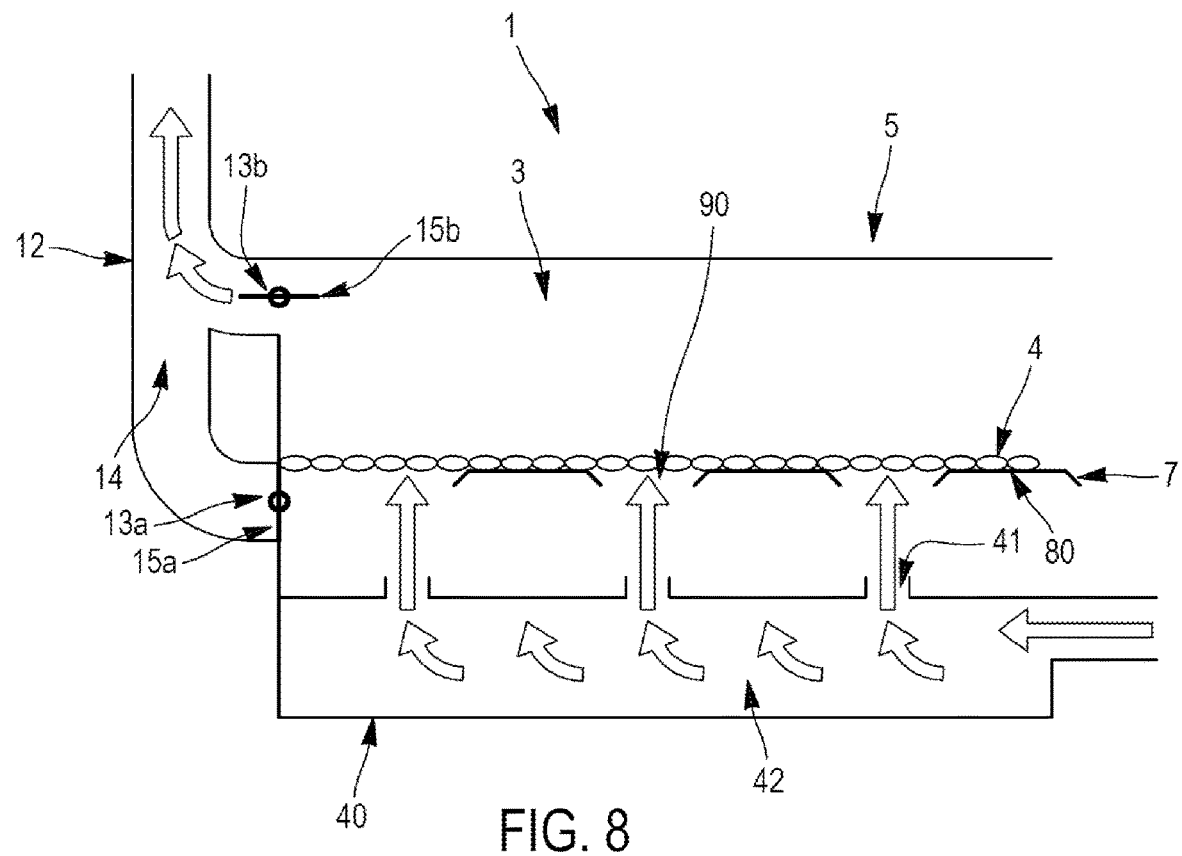
FIG. 8 is a schematic, cross-sectional view similar to FIG. 7, except that the longitudinal blades of the sliding path are in the convective position, offset with respect to the blowing orifices of the heating means, and that the flow of heat-transfer gas is sucked through suction means located above the belt.

With regard to the cooking of the products 2 at the level of the hearth of the module 1 of the invention, this can advantageously be performed, at the choice of the manufacturer and depending on the products 2 to be cooked, essentially by radiation and convection, this cooking method being more particularly shown in FIGS. 2, 5 and 7, or according to a main mode of convection heating in the hearth portion, as shown in FIGS. 1, 6 and 8.

In this context, and most preferably, in said hearth, defined for example by a conveyor belt 4, rests on a sliding surface 7. The sliding surface 7 is comprised of a metal sheet or sheet 8, which comprises rest portions 8A for the conveyor belt 4 and openings 9 for the passing-through of the heat-transfer fluid as in FIG. 9A.

Said sliding surface 7 is movable between at least two positions:
- a first convective position: in this position, the openings 9 of the sliding surface 7 coincide with the blowing orifices 41, as shown in FIG. 1. Here, the heat-transfer fluid can pass through the conveyor belt 4;
- a second radiation position, shown in FIG. 2: there is a shift between the openings 9 of the sliding surface 7 and the blowing orifices 41 and said surface 7 forms a screen for the heat-transfer fluid.

Intermediate positions can also be adopted by the sliding surface 7.

Figure 3:
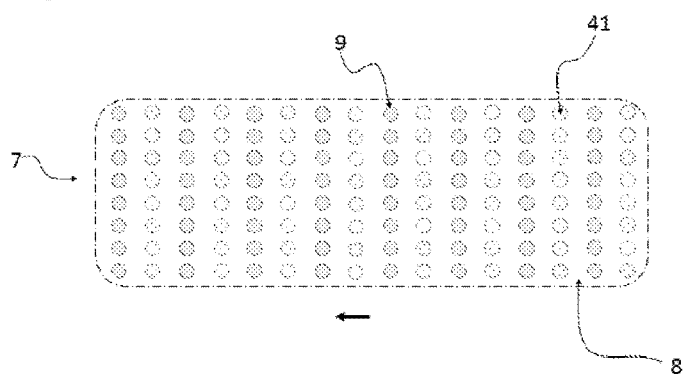
FIG. 3 is a schematic view, seen from above, of a particular embodiment of the present invention, in the so-called radiation position, the blowing orifices of the heating means in the hearth being offset with respect to the openings of the sliding surface, the latter being represented in broken lines.

As can be seen in FIG. 3, the heating means 40 in the hearth may include transverse rows of blowing orifices 41, namely perpendicular to the direction of movement of the conveyor belt 4, these orifices 41 being shown in broken lines, while the sliding surface 7 comprises openings 9, also arranged in transverse rows, the latter being spaced apart according to a spacing pitch corresponding to that of the transverse rows of the blowing orifices 41.

Figure 4:
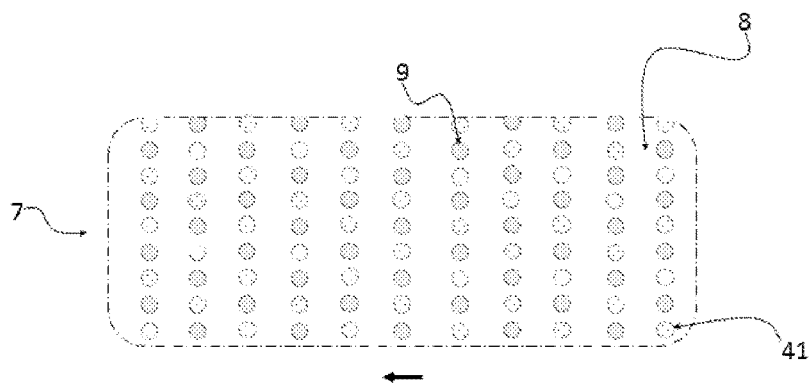
FIG. 4 is a schematic view similar to FIG. 3, corresponding to a further embodiment, in the so-called radiation position.

The embodiment of FIG. 4, which is even more advantageous, permits a particularly uniform blowing of the belt 4, the blowing orifices 41, as well as the openings 9 in the metal sheet 8, being arranged in a staggered way.

In another embodiment, shown in FIGS. 5 and 6, the sliding surface 7 may advantageously include a plurality of sliding blades 80 preferably spaced apart equidistantly over substantially the entire length of the module. 1, and extending substantially transversely, for example, in the direction of movement of said belt 4, as shown in these figures.

It is thus understood, and also through these figures, that two successive sliding blades 80 (rest portions 8A) are separated from each other by a longitudinal slot 90 (openings 9).

For the continuation of the description, the spacing E between two successive sliding blades 80, which corresponds to the distance separating the median plane of said two sliding blades 80 and the spacing e between two successive sliding blades 80, which corresponds to the distance separating said sliding blades 80 are defined.

Figure 9B:
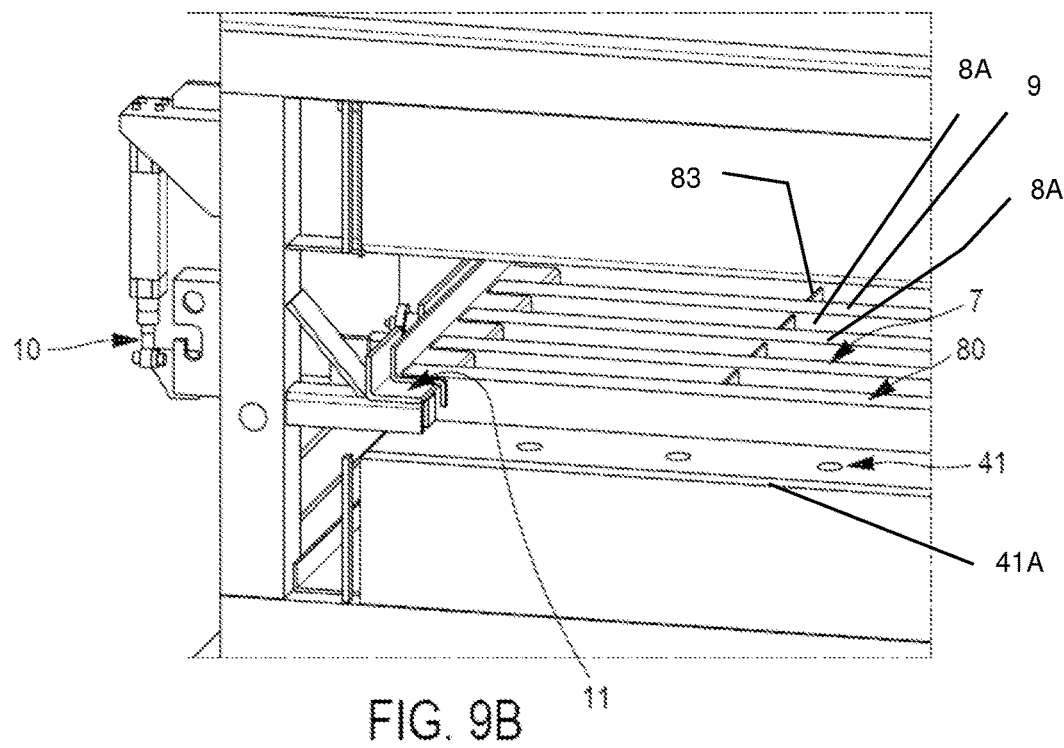

Said sliding blades 80 are preferably made integral with each other through one and/or the other of their side ends, for example by means of iron angles 11, shown in FIG. 9B, or the like.

In a way particular to the cooking module 1 of the invention, said sliding surface 7 is movable above the heating means 40 in the hearth, for example a convection plenum 42.

Yet more particularly, the sliding surface 7 is likely to adopt at least a first position, in which the sliding blades 80 of said surface 7 form completely or partially a screen for the blowing orifices 41 and at least a second position, offset from said first position, in which the heat-transfer fluid flow, propelled through the orifices 41, can pass through the hearth consisting of a conveyor belt 4.

In a very particularly advantageous exemplary embodiment, the sliding surface 7 of the module 1 of the invention is movable between a first position, in which said sliding blades 80 are located directly above said blowing orifices 41 and a second position, offset with respect to said first position, in which the sliding blades 80 are withdrawn in order to let the flow of heat-transfer gas pass through the conveyor belt 4.

The first position, in which the sliding blades 80 advantageously completely form a shield for the flow of heat-transfer gas blown through the orifices 41 from the heating means 40 in the hearth, is schematically shown in the attached FIG. 5.

In this configuration, the sliding blades 80 are placed in the path of the flow of hot heat-transfer gas preferably arriving from the convection plenum 42, said flow abutting against the lower face 81 of the sliding blades 80 and on the upper face 82 of these same blades 80 rests the hearth defined by a conveyor belt 4.

The so heated sliding blades 80 form a metal radiation sheet ensuring a heating of the conveyor belt 4 itself, the latter permitting, through a raise in its temperature, a cooking of the products 2 essentially by radiation and conduction.

Thus, in this first position, a passing of heat-transfer gas directly through the conveyor belt 4 is avoided.

As shown in the attached FIGS. 5 and 6, the sliding blades 80 advantageously have an inverted U-shaped, or an inverted gutter-shaped profile, whereby said legs of the U may be substantially flared at their end opposite the flat portion forming the sliding surface 7 of the conveyor belt 4, such a profile permitting to bring down and guide the flow of heat-transfer gas.

In addition, after reaching the lower face 81 of the sliding blades 80, the heat-transfer fluid, having transmitted its heat to said blades 80, and which is then in the gap between said blades 80 and the heating means 40 in the hearth, can easily be sucked through suction means 12, schematically shown in the embodiment of FIGS. 7 and 8, where the sliding blades 80 consist of longitudinal blades.

In these FIGS. 7 and 8, identical reference numbers are used for designating elements of the module 1 that are identical or correspond to those found in the other figures.

Thus, according to one embodiment of the invention, the cooking module 1 comprises means for sucking the heat-transfer fluid in the hearth 4.

These suction means 12 include suction openings 13*a* being located on at least one of the lateral sides of the hearth, under the latter, preferably on each of the lateral sides, said suction openings 13a being advantageously distributed over the entire length of said hearth.

According to a preferred embodiment, these suction openings 13a communicate, through suitable sleeves 14, with a centralized suction circuit, which suction openings 13b in the cooking chamber 3, above the level of the hearth, are also connected to, as also visible in FIGS. 7 and 8.

Advantageously, these suction means 12 include suction management means 15a, 15b, as the case may be, under and/or above the level of the hearth, depending on the cooking mode that is desired by the user.

Thus, for example, advantageously, when the user wishes to cook his products by conduction and/or radiation, the flow blown in the hearth can be re-sucked into the hearth, under the latter, as shown more particularly in FIG. 7.

When a convection in said chamber 3 is desired, it is conceivable to have a blowing in the hearth, for example, and a suction in the cooking chamber 3 as shown more particularly in FIG. 8.

Returning now to the shape of the sliding blades 80 of the sliding path 7, it has already been specified above that they may have an inverted U-shaped or an inverted gutter-shaped profile. In addition, said blades 80, which are preferably metal sheets, advantageously have a relatively small thickness, so as to prevent them from having a too high thermal inertia.

However, in order to guarantee a stiffening of the assembly and to avoid a deformation due to heating or supporting the conveyor belt 4, the module 1 may include means for stiffening said sliding blades 80, for example in the form of one or more ribs 83 connecting said blades 80 in the longitudinal direction and pairwise.

In the embodiment shown in FIG. 9A, the module 1 includes a single rib 83 between two successive sliding blades 80 connecting said two blades 80 substantially at their centers.

Thus, namely because of the low thermal inertia of the sliding blades 80, it can be considered to quickly switch from a heating mode essentially by radiation and conduction to a heating mode by convection.

In this respect, if the cooking module 1 of the invention has to be used in cooking mode by convection, depending on the products 2 that must be cooked, the sliding surface 7 is moved, from the first so-called radiation position shown in FIGS. 5 and 7, to a second so-called convection position, in which the sliding blades 80 are offset from the orifices 41 for blowing the gaseous heat-transfer fluid.

This second position of the sliding surface 7 comprising sliding blades 80 is schematically shown in the attached FIGS. 6 and 8.

Thus, it is understood that, in this position, the slots 90 of the sliding surface 7 are now in front of the blowing orifices 41.

The flow of gaseous heat-transfer fluid propelled through the blowing orifices 41 then passes through the permeable conveyor belt 4, for example through openings.

In this position, the products 2 to be cooked are subjected to convection heating in the hearth.

The blowing orifices 41, through which the flow of gaseous heat-transfer fluid is propelled, permitting cooking of the products 2 essentially by radiation or by convection, are preferably arranged in transverse rows at the level of the heating means 40 in the hearth, as already mentioned above.

Advantageously, said transverse rows of blasting orifices 41 are spaced apart according to a pitch corresponding substantially to the spacing pitch E of the sliding blades 80 of the sliding path 7, which corresponds to the distance separating the median plane from two successive blades 80.

Thus, when applying to the sliding path 7, through suitable driving means, a stroke corresponding substantially to half the spacing pitch E between two successive sliding blades 80, said sliding path 7 passes from a position, in which the median plane of the blades 80 is located above the center of the blowing orifices 41, to the position, in which the median plane of the slots 90 projects over said orifices 41.

In general, said driving means permit to apply to the sliding surface 7 a path adapted to permit, for example, said surface 7 to pass from the so-called convection position to the so-called radiation position, or vice versa.

These driving means (pusher 10 of FIG. 9B, rod 10A of FIG. 9A) may adopt various embodiments within reach of those skilled in the art.

Thus, driving means can be in the form of a mechanism 10 on a pusher, implementing a jack acting directly or indirectly on said sliding blades 80, in particular at the height of their lateral ends, at the level of which these blades 80 are made integral.

The embodiment, in which such a mechanism 10 drives the sliding surface between the two positions, is shown in FIG. 9B.

Said mechanism 10 is preferably positioned outside the cooking chamber 3, so that the user has the possibility of being able to switch from one cooking mode to another, even when the products 2 are in progress of being cooked in the module 1.

Of course, other driving mechanisms can be contemplated for ensuring the function of moving these sliding blades 80, and more generally the sliding surface 7, for example a chain driving mechanisms or the like.

In addition, as regards the sliding blades 80 of the sliding path 7, they have been described as being transverse blades 80. However, those skilled in the art will easily adapt the present module to longitudinal sliding blades, this embodiment having been shown in FIGS. 7 and 8, the heating means in the hearth comprising, in this case, for example longitudinal rows of blowing orifices 41.

The cooking module 1 of the invention thus permits, in a particularly advantageous manner, to favor, depending on the type of products 2 to be cooked, either convective heating in the hearth or heating essentially by radiation and conduction, or even to combine both.

In brief, such a cooking module 1 according to the invention provides flexible cooking conditions according to the products to be cooked, which is particularly interesting for the manufacturers of the bakery sector or the like.

Finally, the invention also relates to a linear cooking tunnel oven including at least one cooking module as described above.

Said linear tunnel oven advantageously comprises several of these modules juxtaposed to each other, which permits, within each of said modules, different cooking settings, for example different exposures to the flow of heat-transfer gas during the cooking phase of the products.

Obviously, the present invention is not limited to the embodiments that are described here, the persons skilled in the art can make any modifications adapted to the desired function, for example as regards the arrangement of the openings of the sliding surface or that of the blowing orifices of the heating means in the hearth, etc.

I claim:

1. A cooking module for a linear tunnel, comprising:
a cooking chamber comprising a hearth portion and a roof portion above said heart portion;
a movable conveyor belt permeable to a gaseous heat-transfer fluid within said hearth portion;
a first heater in said roof portion;
a second heater in said hearth portion, wherein said second heater comprises:
a blowing surface with a plurality of orifices; and
a sliding surface between said movable conveyor belt and said blowing surface, said movable conveyor belt being rested on said sliding surface,
wherein said sliding surface is comprised of a sheet with a plurality of openings and rest portions in sliding contact with said movable conveyor belt,
wherein said sliding surface has a convection position with one of said plurality of, said openings being in flow alignment with a respective one of said plurality of blowing orifices so as to pass heat transfer fluid through said blowing surface and said sliding surface toward said movable conveyor belt,
wherein said sliding surface has a radiation position with said one of said plurality of said openings being offset with said respective one of said blowing orifices so as to flow heat transfer fluid into said sliding surface and radiate heat from said rest portions toward said movable conveyor belt, and
wherein said sliding surface is movable back and forth between said convection position and said radiation position.

2. The cooking module 1, according to claim 1, wherein said blowing orifices are arranged in transverse rows across said blowing surface, and and wherein said openings are arranged in cooperative transverse rows across said sheet of said sliding surface.

3. The cooking module 1, according to claim 1, wherein said blowing orifices are arranged in staggered rows across said blowing surface, and wherein said openings are arranged in cooperative staggered rows across said sheet of said sliding surface.

4. The cooking module 1, according to claim 1, wherein wherein said blowing orifices are arranged in rows, wherein said rest portions are comprised of sliding blades, each sliding blade extending over a respective row of said blowing orifices in said radiation position, and wherein said openings are comprised of slots between adjacent blades, each slot extending along a respective row of said blowing orifices in said convection position.

5. The cooking module 1, according to claim 4, wherein said rows of blowing orifices are cooperative with said sliding blades and slots so as to move said sliding surface back and forth between said convection position and said radiation position.

6. The cooking module 1, according to claim 4, further comprising:
a driving means for said sliding surface back and forth between said convection position and said radiation position.

7. The cooking module 1, according to claim 4, wherein said sheet is further comprised of means for stiffening said sliding blades, said means for stiffening being comprised of at least one rib connecting adjacent sliding blades.

8. The cooking module 1, according to claim 7, wherein said means for stiffening is comprised of a plurality of ribs distributed across said sheet of said sliding surface.

9. The cooking module 1, according to claim 1, wherein said second heater is further comprised of a convection plenum.

10. The cooking module 1, according to claim 1, further comprising:
means for sucking gaseous heat-transfer fluid from said hearth portion,
wherein said cooking chamber is further comprised of a suction opening being located on a lateral sides of said hearth portion and being in fluid connection with said means for sucking.

11. The cooking module 1, according to claim 10, wherein said means for sucking is further comprised of a plurality of sleeves so as to form a centralized suction circuit,
wherein said cooking chamber is further comprised of an additional suction openings being located in said roof portion and being in fluid connection with said means for sucking through a respective sleeve,
wherein said suction opening is in fluid connection with said means for sucking through another respective sleeve, and
wherein said means for sucking is further comprised of suction management means in fluid connection with said suction opening, and an additional suction management means in fluid connection with said additional suction opening.

12. A linear tunnel oven for cooking, comprising:
cooking module according to claim 1.

13. A linear tunnel oven, comprising:
a plurality of cooking modules, wherein at least one of said cooking modules is comprised of a cooking module, according to claim 1.

* * * * *